(12) United States Patent
Sanders

(10) Patent No.: US 10,157,237 B2
(45) Date of Patent: Dec. 18, 2018

(54) MULTI-USER GROUP SOCIAL NETWORK

(71) Applicant: Jameg Sanders, Bronx, NY (US)

(72) Inventor: Jameg Sanders, Bronx, NY (US)

(*) Notice: Subject to any disclaimer, the term of this patent is extended or adjusted under 35 U.S.C. 154(b) by 622 days.

(21) Appl. No.: 14/720,775

(22) Filed: May 23, 2015

(65) Prior Publication Data

US 2015/0365347 A1    Dec. 17, 2015

Related U.S. Application Data

(60) Provisional application No. 62/002,310, filed on May 23, 2014.

(51) Int. Cl.
  *G06F 17/30* (2006.01)
  *H04L 12/58* (2006.01)
  *G06Q 50/00* (2012.01)

(52) U.S. Cl.
  CPC ....... *G06F 17/30905* (2013.01); *G06Q 50/01* (2013.01); *H04L 51/32* (2013.01)

(58) Field of Classification Search
  CPC ......... G06Q 10/1093; G06Q 30/018–30/0629; G06Q 50/01–50/186; G06Q 10/10; G06Q 30/06–30/0603; H04L 51/20; H04L 51/32; H04L 67/10–67/1097; H04L 67/18; H04L 67/30; H04L 67/306; G06F 8/62; G06F 9/44526–9/544; G06F 17/30011–17/3089
  See application file for complete search history.

(56) References Cited

U.S. PATENT DOCUMENTS

| 8,224,862 | B2 | 7/2012 | Sacks | |
| 8,725,823 | B2* | 5/2014 | Mansfield | H04L 51/32 |
| | | | | 709/206 |
| 2011/0022571 | A1* | 1/2011 | Snyder | G06F 8/62 |
| | | | | 707/692 |
| 2012/0016803 | A1* | 1/2012 | Tharp | G06Q 10/10 |
| | | | | 705/319 |

(Continued)

OTHER PUBLICATIONS

"Facebook Groups—a complete Guide" by Astrom, Jesper on Nov. 27, 2010 published at http://jesperastrom.com/facebook/facebook-groups-guide.*

(Continued)

*Primary Examiner* — Wing F Chan
*Assistant Examiner* — Raji Krishnan
(74) *Attorney, Agent, or Firm* — Mei & Mark LLP; Krystyna Colantoni

(57) ABSTRACT

Managing a social network comprises creating a unique first group code, creating a first personal wall including a link to the first group code, and creating a first group wall for the first group code. The first user receives an inquiry to join the first group code from a second user. The first group code is exchanged between the first user and the second user. The first group wall is converted from a locked to an unlocked state with respect to the second user. A second personal wall is created for the second user, the second personal wall including a link to the first group code. The first user is restricted from viewing the second personal wall, and vice versa. The first user can share, and the second user can see, a subset of data from the first personal wall with the first group wall, and vice versa.

20 Claims, 20 Drawing Sheets

(56) References Cited

U.S. PATENT DOCUMENTS

| | | | | |
|---|---|---|---|---|
| 2012/0072855 | A1* | 3/2012 | Baldwin | G06Q 10/10 715/752 |
| 2013/0204962 | A1* | 8/2013 | Estevez | H04N 7/185 709/217 |
| 2013/0263020 | A1* | 10/2013 | Heiferman | H04L 51/32 715/753 |
| 2013/0325979 | A1* | 12/2013 | Mansfield | H04L 51/32 709/206 |
| 2014/0025591 | A1* | 1/2014 | Villa, III | G06Q 50/186 705/312 |
| 2014/0136619 | A1* | 5/2014 | Hoberman | H04L 67/18 709/204 |

OTHER PUBLICATIONS

"Facebook Privacy: 10 Settings Every User Needs to Know" by Schroeder, Stan published at http://mashable.com/2011/02/07/facebook-privacy-guide/#gwnvq8nODuqQ.*

"How to Join Facebook Group" published at https://www.youtube.com/watch?v=jjsHLnSsvll on Mar. 18, 2013.*

"How to Share a Post from a Facebook Page to a Facebook Group" by Heuer, Kathleen published on Oct. 9, 2013 at http://kathleenheuer.com/2013/10/how-to-share-a-post-from-a-facebook-page-to-a-facebook-group.*

* cited by examiner

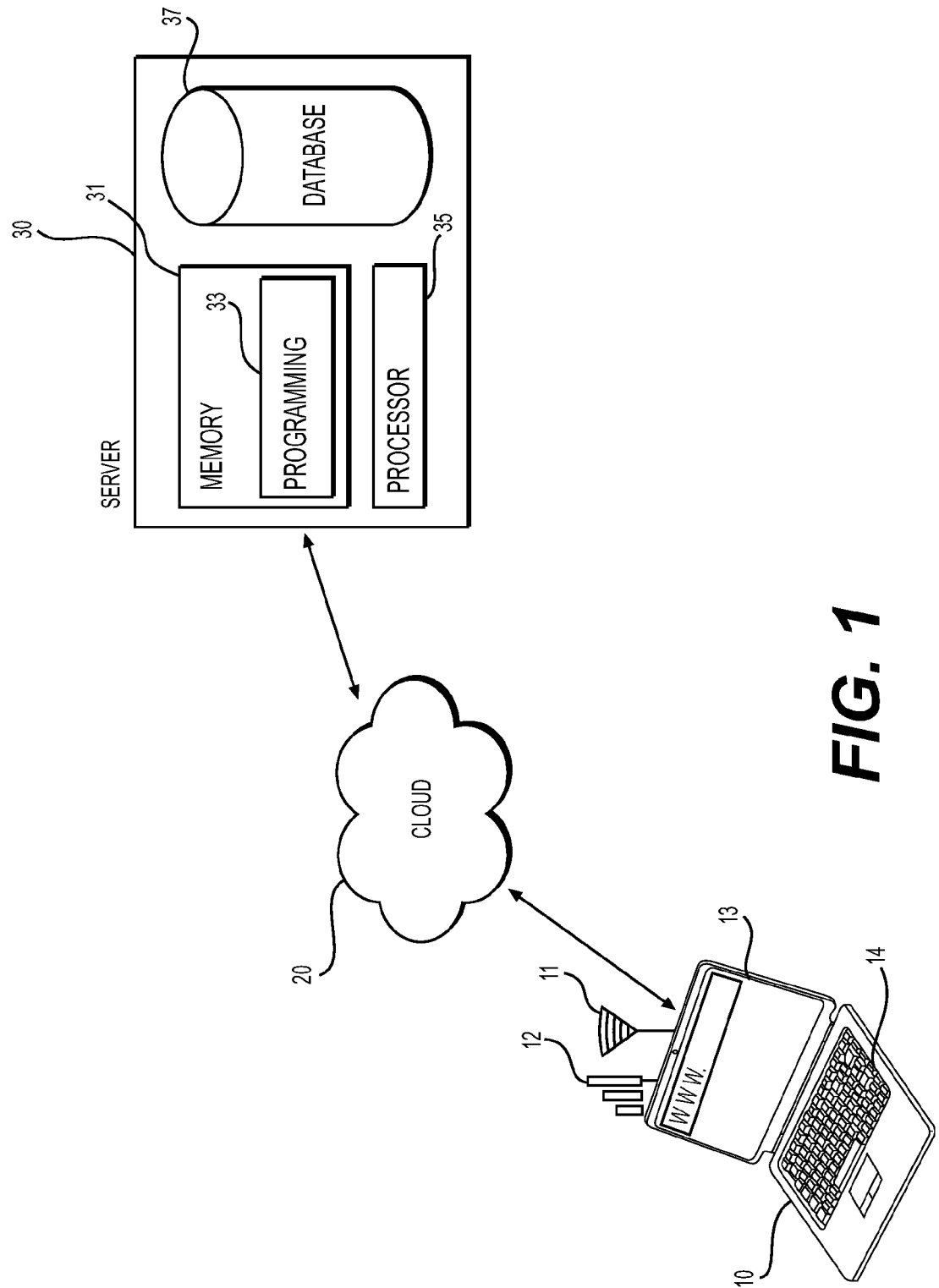

| USER TABLE 1 | | | RELATIONSHIP TABLE | | (GROUP) FAMILY 1 TABLE | | LABEL TABLE | | |
|---|---|---|---|---|---|---|---|---|---|
| PROFILE | SET 1 | SUBSET 1 ... SUBSET N ... | ☑ | SHARE SET 1 WITH GROUP 1 | USER PROFILE USER 1, SET 1 | | USER 1 | GROUP 1 CODE QWERTY | USER 1 LABEL MOM'S SIDE |
| | SET 2 | SUBSET 2 ... SUBSET M ... | ☒ | SHARE SET 2 WITH GROUP 1 | NEWS FEED USER 1: ∅ | | USER 2 | GROUP 1 CODE QWERTY | USER 2 LABEL AUNT'S SIDE |
| | SET X ... | | ☑ | SHARE SET 1 WITH GROUP 2 | FAMILY (GROUP) WALL SHOW SET 1, USER 1 | | USER 1 | GROUP 2 CODE UIOPI 2 | USER 1 LABEL DAD'S SIDE |
| NEWS FEED | NEWS FEED 1 | | ☒ | SHARE SET 2 WITH GROUP 2 | GROUP MEMBERS USER 1 | | USER 2 | GROUP 2 CODE UIOPI 2 | USER 2 LABEL UNCLE'S SIDE |
| PERSONAL WALL | | | ☑ | SHARE P1, P2 WITH GROUP 1 | PHOTOS USER 1: P1, P2 | | USER 3 | GROUP 3 CODE ASDFGH | USER 3 LABEL NBA BRACKET GAME |
| FAMILY MEMBERS | GROUP 1 ... GROUP 2 ... | | ☒ | SHARE P1, P2, P3 WITH GROUP 2 | VIDEOS USER 1: ∅ | | USER 3 | GROUP 2 CODE UIOPI 2 | USER 3 LABEL JOHN DOE |
| PHOTOS | P1, P2, P3, ... | | ☑ | SHARE V1 WITH GROUP 1 AT TIME (T + 100 DAYS) | | | ... | | |
| VIDEOS | V1, V2, V3, ... | | ☑ | POST NEWSFEED 1 AT TIME (T + 100 YEARS) | | | | | |
| SEND MESSAGES | M1, M2, ... | | ☒ | VOTE USER X DECEASED | | | | | |
| FUTURE MESSAGES | FM1, FM2, ... | | ☒ | VOTE NEW USER ACCESS GROUP 1 | | | | | |
| BLOCKED MEMBERS | USER Z ... | | ☒ | VOTE BLOCK USER Z | | | | | |
| ABUSE REPORTS | ∅ | | | | | | | | |
| GONE HOME: | USER X ... | | | | | | | | |

| FAMILY MEMBER TABLE 379 | | | | |
|---|---|---|---|---|
| FAMILY CODE | MEMBERS | PENDING | BLOCKED | |
| GROUP 1 CODE QWERTY | USER 1<br>USER 2<br>USER X<br>... | NEW USER<br>... | USER Z<br>... | |
| GROUP 2 CODE UIOPI 2 | USER 1<br>USER 2<br>USER 3<br>... | ... | ... | |
| GROUP 3 CODE ASDFGH | USER 3<br>... | ... | ... | |
| ... | | | | ... |

| | SERVER: LOCALHOST » DATABASE: cl47-fpw » TABLE: FAMILY_CODE_MEMBERS | | | | |
|---|---|---|---|---|---|
| BROWSE | STRUCTURE | SQL | SEARCH | INSERT | EXPORT | IMPORT | OPERATIONS | | | | |

| # | NAME | TYPE | COLLATION | ATTRIBUTES | NULL | DEFAULT |
|---|---|---|---|---|---|---|
| ☐ 1 | FAMILY_MEMBERS_ID | INT(11) | | | NO | NONE |
| ☐ 2 | MEMBER_ID | INT(11) | | | NO | NONE |
| ☐ 3 | FAMILY_ID | INT(11) | | | NO | NONE |
| ☐ 4 | FAMILY_INIT | ENUM('FALSE', 'TRUE') | LATIN1_SWEDISH_CI | | NO | NONE |
| ☐ 5 | CREATED_DATE | DATETIME | | | NO | NONE |

↰ ☐ CHECK ALL  WITH SELECTED: BROWSE  CHANGE  DROP  PRIMARY  UNIQUE

PRINT VIEW   RELATION VIEW   PROPOSE TABLE STRUCTURE  ?   MOVE COLUMNS
ADD [1]  COLUMN(S) ⊙ AT END OF TABLE ○ AT BEGINNING OF TABLE ○ AFTER [FAMILY_MEMBERS_ID▼]
+ INDEXES

INFORMATION

| SPACE USAGE | |
|---|---|
| DATA | 16 KiB |
| INDEX | 0 B |
| TOTAL | 16 KiB |

| ROW STATISTICS | |
|---|---|
| FORMAT | COMPACT |
| COLLATION | utf8_bin |
| NEXT AUTOINDEX | 78 |
| CREATION | MAR 18, 2015 AT 01:43 PM |

| SERVER: LOCALHOST » DATABASE: cl47-fpw » TABLE: FAMILY_CODES |||||||
|---|---|---|---|---|---|---|
| BROWSE | STRUCTURE | SQL | SEARCH | INSERT | EXPORT | IMPORT | OPERATIONS |
| # | NAME | TYPE | COLLATION | ATTRIBUTES | NULL | DEFAULT |
| ☐ 1 | FAMILY_MEMBERS_ID | INT(11) | | | NO | NONE |
| ☐ 2 | FPW_CODE | VARCHAR(255) | LATIN1_SWEDISH_CI | | NO | NONE |
| ☐ 3 | CREATED_DATE | DATETIME | | | NO | NONE |
| ☐ 4 | FAMILY_LABEL | VARCHAR(255) | LATIN1_SWEDISH_CI | | NO | NONE |

☐ CHECK ALL  WITH SELECTED:  BROWSE  CHANGE  DROP  PRIMARY  UNIQUE

PRINT VIEW   RELATION VIEW   PROPOSE TABLE STRUCTURE   MOVE COLUMNS
ADD [1] COLUMN(S) ⊙ AT END OF TABLE ○ AT BEGINNING OF TABLE ○ AFTER [FAMILY_CODE_ID▼]
+ INDEXES

INFORMATION

| SPACE USAGE ||
|---|---|
| DATA | 16 KiB |
| INDEX | 0 B |
| TOTAL | 16 KiB |

| ROW STATISTICS ||
|---|---|
| FORMAT | COMPACT |
| COLLATION | utf8_bin |
| NEXT AUTOINDEX | 57 |
| CREATION | MAR 18, 2015 AT 01:43 PM |

FIG. 2D

| EXTRA | ACTION | | | | | | | |
|---|---|---|---|---|---|---|---|---|
| AUTO_INCREMENT | ⌀ CHANGE | ⊖ DROP | ⌀ PRIMARY | ▥ UNIQUE | ▨ INDEX | ▤ SPATIAL | ▥ FULL TEXT | ▼ MORE |
| | ⌀ CHANGE | ⊖ DROP | ⌀ PRIMARY | ▥ UNIQUE | ▨ INDEX | ▤ SPATIAL | ▥ FULL TEXT | ▼ MORE |
| | ⌀ CHANGE | ⊖ DROP | ⌀ PRIMARY | ▥ UNIQUE | ▨ INDEX | ▤ SPATIAL | ▥ FULL TEXT | ▼ MORE |
| | ⌀ CHANGE | ⊖ DROP | ⌀ PRIMARY | ▥ UNIQUE | ▨ INDEX | ▤ SPATIAL | ▥ FULL TEXT | ▼ MORE |

▨ INDEX (GO)

FIG. 2D
CONTINUED

| | | | | 3711 | | |
|---|---|---|---|---|---|---|
| → SERVER: LOCALHOST » DATABASE: cl47-fpw » TABLE: USER_UPLOADS | | | | | | |
| BROWSE | STRUCTURE | SQL | SEARCH | INSERT | EXPORT | IMPORT | OPERATIONS |
| # NAME | TYPE | COLLATION | ATTRIBUTES | NULL | DEFAULT |
| ☐ 1 ID | INT(11) | | | NO | NONE |
| ☐ 2 IMAGE_PATH | VARCHAR(30) | LATIN1_SWEDISH_CI | | YES | NULL |
| ☐ 3 IMAGE_LABEL | VARCHAR(255) | LATIN1_SWEDISH_CI | | NO | NONE |
| ☐ 4 IMAGE_PRIVACY | ENUM('PRIVATE', 'PUBLIC') | LATIN1_SWEDISH_CI | | NO | NONE |
| ☐ 5 ALBUM_ID | INT(11) | | | NO | NONE |
| ☐ 6 UID_FK | INT(11) | | | YES | NULL |
| ☐ 7 FAMILY_ID | INT(11) | | | NO | NONE |
| ☐ 8 CREATED_DATE | INT(11) | | | NO | NONE |

↑ ☐ CHECK ALL  WITH SELECTED: BROWSE  CHANGE  DROP  PRIMARY  UNIQUE

PRINT VIEW   PROPOSE TABLE STRUCTURE ⊙   MOVE COLUMNS
ADD [1] COLUMN(S) ⊙ AT END OF TABLE ○ AT BEGINNING OF TABLE ○ AFTER [ID ▼]
+ INDEXES

INFORMATION

| SPACE USAGE | |
|---|---|
| DATA | 13.3 KiB |
| INDEX | 12 KiB |
| TOTAL | 25.3 KiB |

| ROW STATISTICS | |
|---|---|
| FORMAT | DYNAMIC |
| COLLATION | utf8_bin |
| ROWS | 302 |
| ROW LENGTH | 45 B |
| ROW SIZE | 86 B |
| NEXT AUTOINDEX | 811 |
| CREATION | MAR 18, 2015 AT 01:43 PM |
| LAST UPDATE | MAY 07, 2015 AT 08:26 PM |
| LAST CHECK | MAR 18, 2015 AT 01:43 PM |

*FIG. 2E*

| | | | | | 3713 |
|---|---|---|---|---|---|
| → SERVER: LOCALHOST » DATABASE: cl47-fpw » TABLE: PHOTO_COMMENTS | | | | | |
| BROWSE STRUCTURE SQL SEARCH INSERT EXPORT IMPORT OPERATIONS | | | | | |
| # | NAME | TYPE | COLLATION | ATTRIBUTES | NULL | DEFAULT |

| # | NAME | TYPE | COLLATION | ATTRIBUTES | NULL | DEFAULT |
|---|---|---|---|---|---|---|
| □ 1 | PHOTO_COMMENT_ID | INT(11) | | | NO | NONE |
| □ 2 | PHOTO_ID | INT(11) | | | NO | NONE |
| □ 3 | USER_ID | INT(11) | | | NO | NONE |
| □ 4 | COMMENT_MESSAGE | TEXT | LATIN1_SWEDISH_CI | | NO | NONE |
| □ 5 | CREATED_DATE | VARCHAR(50) | LATIN1_SWEDISH_CI | | NO | NONE |

↑ □ CHECK ALL  WITH SELECTED: BROWSE  CHANGE  DROP  PRIMARY  UNIQUE

PRINT VIEW  RELATION VIEW  PROPOSE TABLE STRUCTURE ⓘ  MOVE COLUMNS
ADD [1] COLUMN(S) ⦿ AT END OF TABLE ○ AT BEGINNING OF TABLE ○ AFTER [PHOTO_COMMENT_ID▼]
+ INDEXES

INFORMATION

| SPACE USAGE | |
|---|---|
| DATA | 16 KiB |
| INDEX | 0 B |
| TOTAL | 16 KiB |

| ROW STATISTICS | |
|---|---|
| FORMAT | COMPACT |
| COLLATION | utf8_bin |
| NEXT AUTOINDEX | 417 |
| CREATION | MAR 18, 2015 AT 01:43 PM |

| → | SERVER: LOCALHOST » DATABASE: cl47-fpw » TABLE: MEMBERS | | | | | |
|---|---|---|---|---|---|---|
| BROWSE | STRUCTURE | SQL | SEARCH | INSERT | EXPORT | IMPORT | OPERATIONS |

| # | NAME | TYPE | COLLATION | ATTRIBUTES | NULL | DEFAULT |
|---|---|---|---|---|---|---|
| ☐ 1 | UID | INT(11) | | | NO | NONE |
| ☐ 2 | USERNAME | VARCHAR(30) | LATIN1_SWEDISH_CI | | YES | NULL |
| ☐ 3 | PASSWORD | VARCHAR(100) | LATIN1_SWEDISH_CI | | YES | NULL |
| ☐ 4 | EMAIL | VARCHAR(100) | LATIN1_SWEDISH_CI | | YES | NULL |
| ☐ 5 | PROFILE_PIC | VARCHAR(200) | LATIN1_SWEDISH_CI | | YES | NULL |
| ☐ 6 | FRIEND_COUNT | INT(11) | | | YES | 0 |
| ☐ 7 | STATUS | INT(1) | | | YES | 1 |
| ☐ 8 | TOKEN | VARCHAR(15) | LATIN1_SWEDISH_CI | | NO | NONE |
| ☐ 9 | NAME | VARCHAR(150) | LATIN1_SWEDISH_CI | | YES | NULL |
| ☐ 10 | PROFILE_PIC_STATUS | INT(1) | | | YES | 0 |
| ☐ 11 | CONVERSATION_COUNT | INT(11) | | | YES | 0 |
| ☐ 12 | UPDATES_COUNT | INT(11) | | | YES | 0 |
| ☐ 13 | FIRST_NAME | VARCHAR(200) | LATIN1_SWEDISH_CI | | YES | NULL |
| ☐ 14 | LAST_NAME | VARCHAR(200) | LATIN1_SWEDISH_CI | | YES | NULL |
| ☐ 15 | GENDER | ENUM('MALE', 'FEMALE') | LATIN1_SWEDISH_CI | | YES | NULL |
| ☐ 16 | BIRTHDAY | VARCHAR(20) | LATIN1_SWEDISH_CI | | YES | NULL |
| ☐ 17 | STATE | VARCHAR(200) | LATIN1_SWEDISH_CI | | YES | NULL |
| ☐ 18 | CITY | VARCHAR(200) | LATIN1_SWEDISH_CI | | YES | NULL |
| ☐ 19 | ADDRESS | TEXT | LATIN1_SWEDISH_CI | | YES | NULL |
| ☐ 20 | POSTCODE | VARCHAR(30) | LATIN1_SWEDISH_CI | | YES | NULL |
| ☐ 21 | BIRTHPLACE | VARCHAR(255) | LATIN1_SWEDISH_CI | | YES | NULL |
| ☐ 22 | COUNTRY | VARCHAR(200) | LATIN1_SWEDISH_CI | | YES | NULL |
| ☐ 23 | LAST_LOGGED_FAMILY | VARCHAR(15) | LATIN1_SWEDISH_CI | | YES | NULL |
| ☐ 24 | FLAG | ENUM('0', '1') | LATIN1_SWEDISH_CI | | NO | NONE |
| ☐ 25 | CREATED_DATE | DATETIME | | | NO | NONE |
| ☐ 26 | MODIFIED_BY | INT(11) | | | NO | NONE |
| ☐ 27 | MODIFIED_DATE | DATETIME | | | NO | NONE |

↑ ☐ CHECK ALL  WITH SELECTED: BROWSE  CHANGE  DROP  PRIMARY  UNIQUE

PRINT VIEW  PROPOSE TABLE STRUCTURE ⓘ  MOVE COLUMNS
ADD [1] COLUMN(S) ⦿ AT END OF TABLE ○ AT BEGINNING OF TABLE ○ AFTER [UID ▼]
+ INDEXES

INFORMATION

| SPACE USAGE | |
|---|---|
| DATA | 10.9 KiB |
| INDEX | 2 KiB |
| TOTAL | 12.9 KiB |

| ROW STATISTICS | |
|---|---|
| FORMAT | DYNAMIC |
| COLLATION | utf8_bin |
| ROWS | 74 |
| ROW LENGTH | 151 B |
| ROW SIZE | 179 B |
| NEXT AUTOINDEX | 80 |
| CREATION | MAR 18, 2015 AT 01:43 PM |
| LAST UPDATE | MAR 09, 2015 AT 11:13 PM |

FIG. 2G

| EXTRA | ACTION | | | | | | |
|---|---|---|---|---|---|---|---|
| AUTO_INCREMENT | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |
| | ✎ CHANGE | ⊖ DROP | 🔑 PRIMARY | 🔟 UNIQUE | 📇 INDEX | 🗺 SPATIAL | ▼ MORE |

📇 INDEX   🗺 SPATIAL   📰 FULLTEXT (GO)

FIG. 2G
*CONTINUED*

MULTI-USER GROUP SOCIAL NETWORK

FIELD

This application relates to social networking applications. More specifically, the application provides methods and devices for securely customizing family connections and legacy settings.

BACKGROUND

Social networks are too inclusive and do not permit users to set up multiple accounts under one user login. Users are expected to have a single account and to share posted information with all users, regardless of that user's affiliation to other members. This causes both privacy and propriety concerns. What you would share with a friend is not necessarily what you would share with an elder family member.

Many social networks also delete or lock user accounts when the user passes on or when the user fails some login or use requirement. Users cannot leave a legacy of information for others.

Many sites also do not discriminate security or privacy settings, or permit sharing data selectively. User information is easily hacked, or easily viewed by persons that the user would prefer not to share information with.

SUMMARY

The methods and network disclosed herein overcome the above disadvantages and improves the art by way of a computer-implemented method of managing a social network, comprising receiving a first user login, creating a unique first group code for the first user, creating a first personal wall for the first user, the first personal wall including a link to the first group code and creating a first group wall for the first group code. Via messaging, a network inquiry, or email, the first user receives an inquiry to join the first group code from a second user. The method then comprises exchanging the first group code between the first user and the second user and converting the first group wall from a locked to an unlocked state with respect to the second user, wherein the locked state restricts the second user from accessing the first group wall, and wherein the unlocked state shares the first group wall with the second user. A second personal wall is created for the second user, the second personal wall including a link to the first group code. The first user is restricted from viewing the second personal wall. The second user is restricted from viewing the first personal wall. The first user can share, and the second user can see, a subset of data from the first personal wall with the first group wall, and the second user can share, and the first user can see, another subset of data from the second user personal wall with the first group wall.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIG. 1 is a simplified network for running the programming across devices.

FIGS. 2A-2G are tables and sub-tables within databases in the network.

DETAILED DESCRIPTION

Figure 2C:
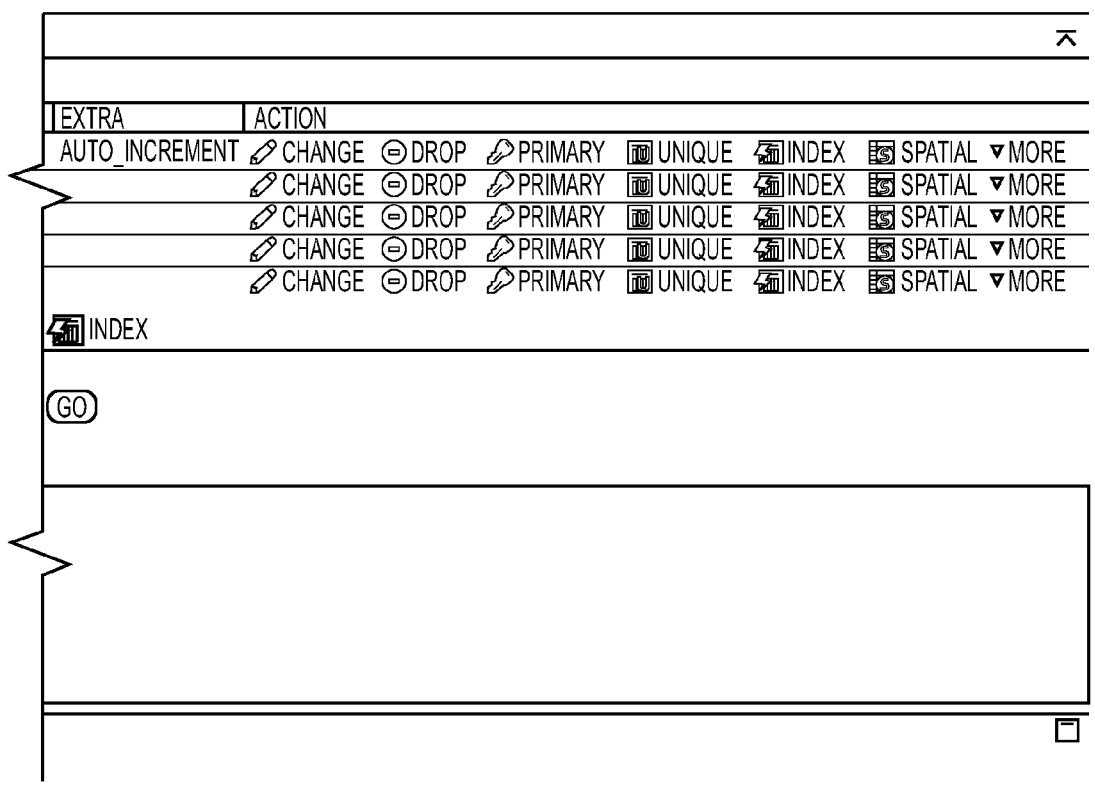

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

A system and method for storing data comprises at least one processor, at least one server for communicating with the processor, at least one storage device coupled to the server, and at least one processor-executable instructions. The instructions, when executed, implement a method for creating or accessing a multi-user group legacy network. Users can interact in a social network and securely customize family connections and legacy settings. Such a social network can be used to create, for example, a family picture will.

A method for creating a family picture will comprises at least steps of entering family information, generating a unique user identification for the family, and affiliating data about the family with the user identification. The family information may be input by a plurality of users to build an online family tree. The family tree includes picture data of family members and family history data. To access the family picture will, a user must input the unique user identification. Unlike prior art systems, a user can collect multiple user identifications and set up multiple families under a single user account. This permits a user to customize family connections in a way the prior art does not permit. For example, it is possible to set up one user identification for a first family comprising paternal family members. A second family with a second user identification can be set up for maternal family members. Yet a third user identification can be set up for a third family comprising a combination of maternal and paternal family members. In this way, a user has a centralized location for family information under a single login. When sharing information, a user can share with all three families at once, or with a single one of the families by selecting which family or families to share with. This provides the user with the ability to quickly share content, but to restrict access at the same time. For example, should the third family group comprise cousins participating in a family activity, such as a sports bracket game, a user can post a comment to the third family, but such a comment is not posted to each and every member of the maternal and paternal family. This permits inside jokes and other behaviors typical of family groups. It also permits discretion to post comments or share information to only a maternal group or paternal group when, for example, the groups are not on speaking terms.

Because a user is not limited to a single social group, the user can aggregate multiple family codes. A user elects which other users to invite to a family code, and other users elect which family codes to join. Should a user elect not to share information with an ex-spouse of a distant relative, that user can refuse to join a particular family code, or elect not to share posts with that family code. This is unlike other social networks and genealogy applications that mandate linkages and sharing between all users.

A user device, such as a smartphone, iPad, computer, laptop or other computing device is connected to the system for storing data to access the instructions for creating or accessing the family picture will. The instructions may be downloaded to the user device, for execution by the user device processor. Or, the instructions may remain remote on the system and be accessible through the server. The server is then configured to communicate with the user device to transfer data between the user device and the at least one storage device via a remote processor. This is summarized in FIG. 1.

Figure 7:
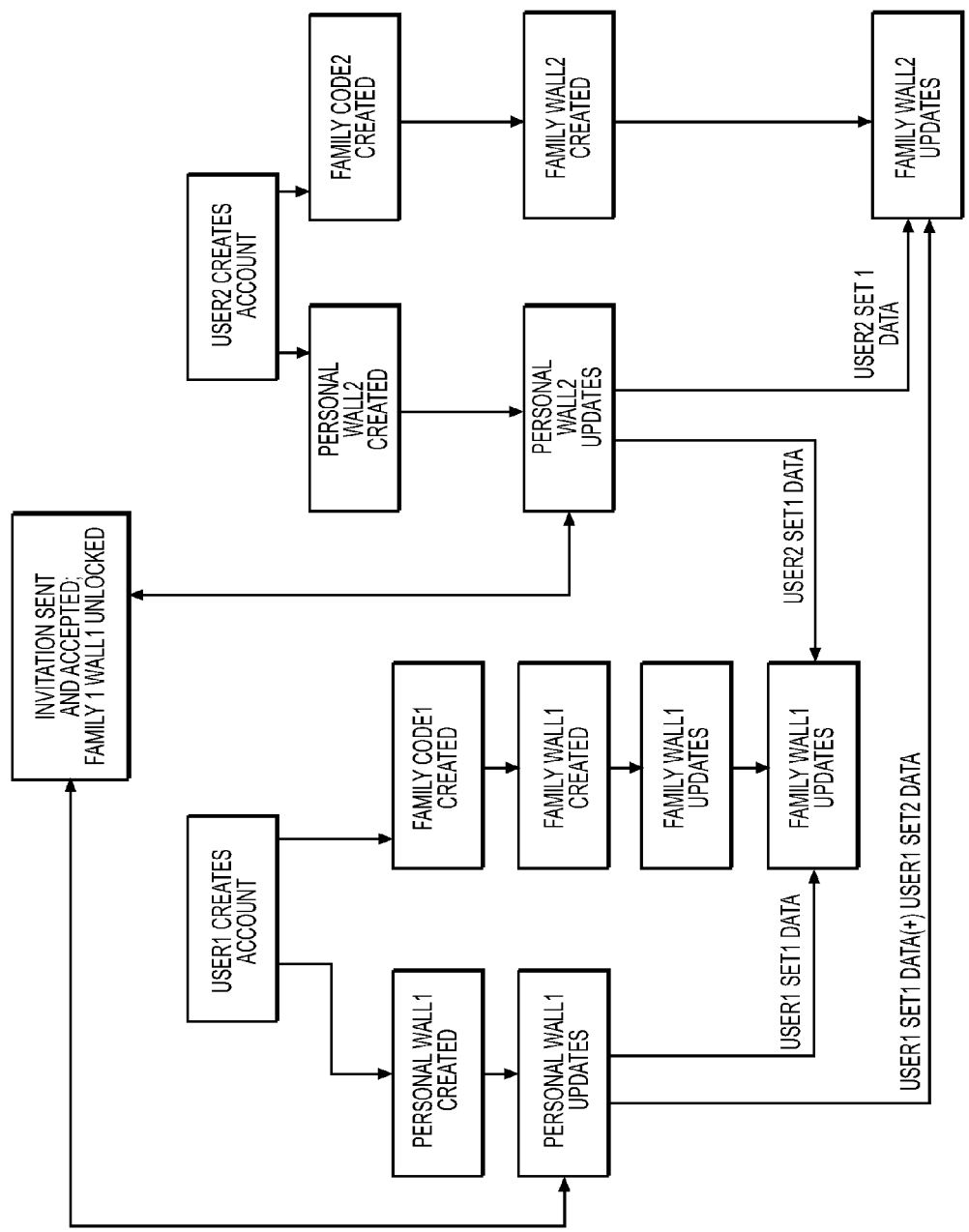
FIG. 7 is an example of user account creation and data sharing.

In order to create or access a family picture will a user creates an account and sets up a personal wall, summarized in FIG. 7. Personal walls are private to the user and can serve as a central location for user information, such as pictures, notes, messages, and information germane to genealogy and heredity. The user can participate in the social network while still reserving information privately to themselves. The user can elect which private personal wall information to share with which family code and at what time to share the information. As below, the user can set up their personal wall to send messages at future times or to post information to family newsfeeds at elected times.

The user can initiate a family wall where shared information is linked to other users. The family wall is assigned a family code so that users can link to the family wall by joining the application and entering the family code.

Family information is entered and affiliated with the family code, which is a unique family identifier. Family information includes information regarding relatives within the family, such as name, occupation, birth date, residence, burial information, spouse, parent, and child information of the relative. When an affiliated family member passes away their profile remains open to other family members and future family members. The personal wall of the decedent becomes shared with other family code members so that members can see at least the genealogy and heredity information of the decedent.

Figure 9:
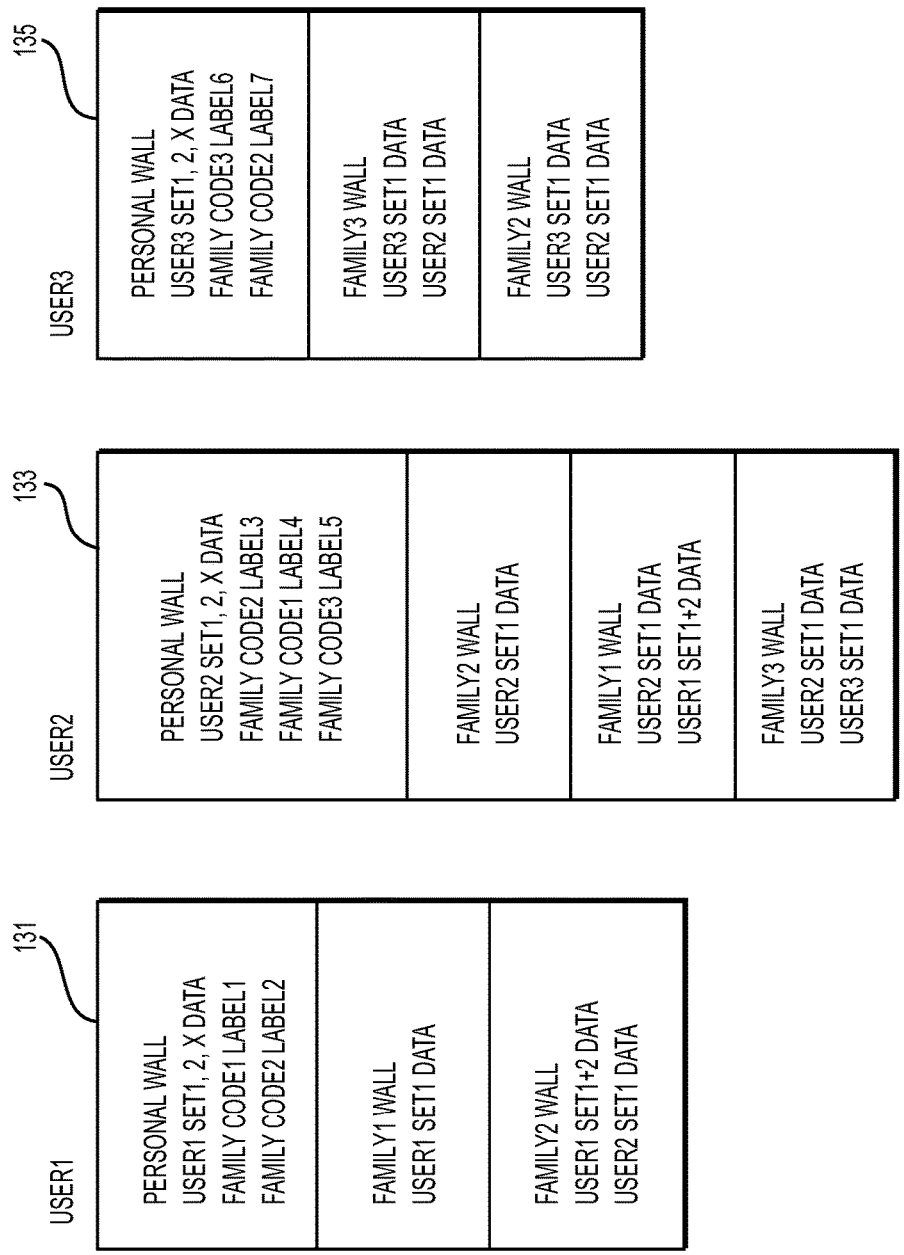
FIG. 9 is an example of user displays.

The family information shows on the family profile page, such as on the top right of the screen, forever, or until taken down by a member of the family code. Users can hover over certain family member information rendered on the user device and receive options to view additional family member information. For example, a user can place their mouse on the family member name, and information is rendered to give the user the option to press a link and view the profile. With additional functionality, such as an "application" or "app" for the user device, users have one-tap capabilities to view options like family information or member profile. Sample user displays for first user display 131, second user display 133, and third user display 135 are shown in FIG. 9 to contrast information shared on personal wall and family walls of the user account.

Family walls have a newsfeed feature that permits family code members to post shared information to one another. This differs from the messaging capability that personal walls have. The posted information to the newsfeed can be done in real time, or it can be scheduled in advance. For example, a family code member can schedule a birthday greeting to an individual member in advance and it is transmitted via messaging to only that individual member. When posting to the newsfeed, the member can elect future dates and post a message to the family wall, viewable by all family code members. This allows a person to schedule a message decades in advance to celebrate a family milestone, such as an anniversary of emigration, or to share in another celebration, such as the member's $100^{th}$ birthday. Such cross-generational sharing gives the family a sense of continuity and connectedness.

While messages go between individual users, users in real time, the newsfeed option permits communications with future members in a way that prior art social networks do not permit. A family code member does not need an account at the time of newsfeed generation to receive a communication from another member at a later date. And, a user can have a deceased status, yet have scheduled shared content to push to the family wall or family newsfeed. Because the family wall is a shared account, the constraints of current social networks is overcome. The shared social network becomes a mechanism to link a user account with future user accounts.

Every family has a unique family code. The family code is unique, similar to an individual Social Security Number, and is used for the whole family. Users can input the family code and affiliate with family code to belong to a particular family picture will. The family profile page is also affiliated with the family code and can be viewed after inputting the family code.

Users can search for family members to affiliate with a family code. When a user looks for a family member to add to the family code, a user inputs their name in to the network search box. The programming scans a user table in a database to look for matches. Should matches occur, a list of people with the same name is shown along with further identifying attributes, such as the state and city, age, race and gender of the member. Other information, such as parent information, can be displayed to permit the user to check for connectedness to the database matches.

The list of matches is linked to additional user information and family member information, and by clicking on an entry on the list, the additional user information and family member information are displayed, such as sibling, parent, or other family member information. If the information linked to the entry is familiar, a user can send an informational note via messaging services to the user affiliated with the entry. Then a note will appear on the family profile wall, or on the personal wall, of the user affiliated with the entry. The note includes data related to the inquiring user's family member information, such as sibling, parent, the user's name and age, etc. The receiving user affiliated with the list entry can review the note and accept the inquiring user as a family member by clicking a link. The server will then send the family number to the receiving user to allow the user access to the family profile of the inquiring user.

Alternatively, when a member knows email or other contact information for a relative, the member can give the family code to the relative. The relative can then set up a personal wall and user account. The family code can be used during set-up or afterwards to add that family code to the relative's account.

Users create individual accounts and enter family member information such as mother, father, sister, brother, grandparents, aunts, uncles, cousins, etc, along with residence information. The processor accesses data in the storage device, compares the entered family member information to stored data, and creates a list of similar data to match a user with existing users and existing user family numbers.

If a user is in possession of a family code number, upon creation of an individual account, the processor will assign the user to the family information affiliated with that family code number. The user can enter information to update or create a profile. Every other member affiliated with the family code number will get a message saying a new family member has joined. For example, if a user's cousin wishes to affiliate with a family profile, a user gives his cousin the family code number affiliated with the appropriate family profile. The cousin enters the family code number and is directed to the family wall.

To combat unauthorized or unwanted access by others, family members can flag affiliated users of the family code. The flag can indicate the need to remove that affiliated user. A metric, such as receiving five flags from family members, causes the affiliated user to be deleted off the family code.

Figure 8:
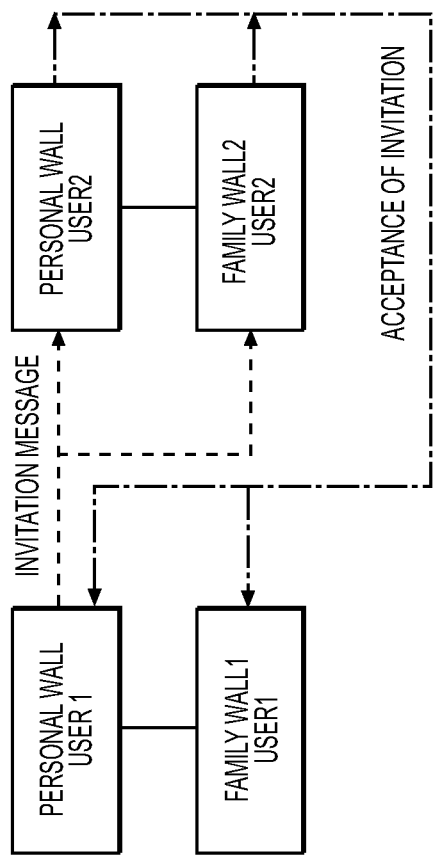
FIG. 8 is an example of user account interactions for joining a family code.

Thus, it is possible to set "approval" metrics and "rejection" metrics. For example, a user can set up a family code and invite a core number of other relatives to join the family code. Once a critical number of other members has been reached, such as three or five family code members, a minimum number of approvals must be gathered to add other users to the family code. This permits privacy controls over shared information. A parent, for example, can verify that a child's acceptance of an inquiring user is indeed a welcome member of the family. Likewise, should, for example, an imposter gain access to the family code, a minimum number of family code members can elect to remove the imposter from the family's family code. FIG. 8 summarizes that a user can invite new members to a family code from their personal wall. The invitation can appear on the personal wall of a second user. Alternatively, or in addition, the invitation can appear on the family wall of the second user. The second user can accept the invitation and the first family wall unlocks for the second user to access. The acceptance can post to one or both of the first personal wall and the first family wall. As above, when implementing metrics, a minimum number of acceptances can be gathered on the second user family wall prior to joining the first family code. When the minimum number of acceptances are received, the first family wall unlocks to the second family or to the second user. The second user is listed as a family code member on the first personal wall, and the first user is listed as a family code member on the second personal wall.

An intended purpose of the social network is to prepare a legacy for intergenerational family communication. Therefore, postings are dated. Every picture entered shows the date and time it was put on the family profile wall. This provides users with chronology for family events.

When making a profile, or when entering family member information, users can send a message to other family code members to be read at another time, such as 5, 10, 15, 20 years later. The message won't be able to be read until the date a user selects he wants the family members to get the message. Users can also send a message that every affiliated member will get on the date selected. Messages can be sent to future family members. For example, should you have an unborn child, you can prepare messages for them to read at later points in their life. This messaging is possible by setting up a user account for the child and then preparing messages under the personal wall. Messages will post to the family wall or appear on individual user walls affiliated with a family code number as selected by the user. Thus, a message tab includes a sub menu to schedule when the message should be transmitted by the server. Selecting a "future message" tab allows a user to select a send date for the message.

The network provides options to send messages to individual family members and to post things for the whole family to see. The family picture will provides a filter for accessing user information. Instead of uninvited guests viewing your family member information, only affiliated family members can view postings to your personal or family walls.

Users will have a personal wall, and the whole family code number will have a family wall. One login option directs users to the family code number family wall (the family picture will) and then users navigate to their personal profile wall, or vice versa. Preferably, all family members view the same family code number wall upon login.

Users can aggregate family code numbers, summarized in FIG. 9. Thus, a user can affiliate with more than one family code number. A central listing provides a user with a repository for family code numbers and their associated profile names. Additional functionality records data for the family code number profile last viewed by the user and direct a user to that profile upon login. The user can navigate to other profile pages in the aggregate family code list. The user can edit the aggregate family code list to append the user's own labels to the list. The labels can include additional family member information to quickly inform the user of the family information. Unlike other social networks, the labels are private to the user on their personal wall, as summarized in FIG. 9. Other members cannot see the personal wall labels of a particular user. The system includes a table for storing the family codes and each user's names for the family codes. Users see their labels when instances of their family codes appear. This works both to make it convenient for a user to identify the family with which they want to communicate or view, but it also provides privacy. The family code is not shown, so onlookers or imposters cannot see and intercept the code.

Users can click pictures displayed on the family wall. Clicking the picture takes the user to the member profile page affiliated with the picture and the user can view data to know the user's relationship to that member.

Users can load videos and affiliate them with their personal wall or their family wall.

Pages of information affiliated with family code numbers are private to other family code users. Whole family information is private until another user is granted access to the family code number. Other members can only see a profile page if granted access. Other network members cannot see individual profile pages of family members nor the family code family wall until those other family members grant the other member access to the family code.

Users can introduce new users to deceased family members by creating a profile for the new user. The new user is affiliated with the family code number of the deceased family member, and the new user can learn about the decedent. Because the family picture will includes photos, the new user will not have to wonder how decedent looked. The network promotes inter and intra generational connectedness and fosters the creation of information legacies.

Family member information further includes current location, date of birth, and birthplace information. A users personal wall will provide space for birth place, parent's birthplace, and how many sisters and brothers. This is the same or similar information in an obituary. But, this is default information that comes up on your profile. This default information can be viewed by a user searching the network for family members. The default information helps other users find a user profile and family member information whether the user is alive or deceased.

Once a family member passes away, the final resting location will be on the family code number profile page under a "deceased" or "gone home" tab. Information such as burial location and cause of death can be appended to create a historic record of the decedent. This way, future family have a record of family members in a central location. Metrics, similar to the above acceptance and rejection metrics, provide a mechanism for converting a user's personal wall from private to shared upon the user passing on. Converting the personal wall to shared permits the family code members to append the additional information, locks a subset of information as no longer viewable, keeps scheduled messages and newsfeeds in storage to facilitate legacy communications, and prevents wholesale deletion of decedent's information.

The server relays user inputs to the processor. The processor compares user inputs to data in the storage device. When a user inputs at least two pieces of information for a given family member, such as a relative's name, birthplace, date of birth, resting place, etc., those two pieces of information are compared to other inputted family member information stored in the storage device. If the user input information matches family member information in the storage device, the processor generates a match indicator and the server relays the match indicator to the user. The match indicator includes, for example, notice of a previous instance of that family member on a profile page. A special message can be generated by the inquiring user to connect with the matching family code. But, the system filters the family code information so that the inquiring user cannot see it until granted access. The special message can post to the family wall for family approval or rejection.

The family code family wall will have the latest pictures posted by family members. Thus, the instructions configure the processor to refresh the profile page based on time and date data affiliated with picture files.

Because it can be time-consuming for users to create and update individual profile and family member information, the processor will generate and the server will transmit to the user device, a positive reinforcement message to encourage users to enter updates. When a user visits the family picture will, different phrases will be displayed to encourage the user to continue updating the legacy information. A banner can cycle through, for example, 5 phrases during a site visit. The phrases state why the site is good or helpful. For example: "family picture will: the site that brings you close to family hundreds of miles away," "family picture will: the site that brings you close to family that you haven't even met face to face with but yet it feels like you have." Other example phrases include "Leaving photos from the present to introduce yourself to family in the future"; "family picture will: bringing you the experience of a real family connection"; "don't be surprised how far your grand parent's name can take you"; "Don't be surprised how far family picture will can take you"; "The website that's bringing family together for eternity"; "Family Picture Will is keeping family connected with one another forever"; "Imagine leaving your unborn a message. With family picture will, you can do that"; "Family picture will: giving the future a look at the past & present"; "Finally an app with an ever lasting meaning."

Users can create member profile pages for minors, such as newborns, and relatives can create messages that will be delivered to the minor's personal wall on a designated date.

Users can designate whether messages are delivered to individual family member inboxes or the messages are posted to the family code family wall.

Family picture will includes instructions for indicating some user pictures as private and other pictures as viewable by other family code affiliated users. When creating a family picture will, a user indicates an uploaded picture file is private, and that picture file is only viewed by the user. Other picture files are indicated as "unlocked," and other affiliated users can view the picture file. A user can convert picture files between "locked" and "unlocked." Should the user pass on, other members can indicate the "deceased" status. A metric can be implemented to require a minimum of family members to approve of the status change before a page is unlocked. The processor unlocks the private picture files and the unlocked picture files are viewable by affiliated users.

Unlike other social networks requiring re-upload to post information to multiple pages, a user can upload once to their personal wall. From there, drag and drop functionality is included to post picture files to multiple family codes at once. The user can select fewer than all family codes to post to. Thus, users can be more selective about sharing without the inconvenience of re-uploading for each posting.

A single user email address can be affiliated with multiple family codes. The granularity provides users functionality to post appropriate information to their family groups. For example, when a family is divorced, it is possible to have a family code for each side of the family. Verbiage can be tailored to each side of the family.

Additional functionality includes family sports team affiliations, such as family MLB, family NFL, and family NHL. Separate family codes can link affiliates with their sports team profile page. Thus, family members can participate in bonding activities in a central location.

FIG. 1 shows the basic layout for user communication. A user accesses a device, such as a tablet, smartphone, laptop or desktop computer or other browser-accessible tool 10. Such a tool 10 has at least transmit 11, receive 12, display 13, and input 14 capabilities. The display 13 shows a web or application ("app") page. The tool 10 communicates with the internet cloud 20, which connects to a server 30. The server 30 is a computing device with a tangible storage medium (memory) 31. The non-transient memory 31 stores programming 33 for processing in a processor 35 data. Data is transmitted between the tool 10 and the database 37. Programming 33 includes instructions for assembling data into viewable renderings for display on the tool 10, and further includes instructions to form selectable areas on the display for users to interact with the server 30.

Database 37 comprises at least four tables for organizing data. Relationships between different users and families are kept in the database 37.

When a new user signs up for the first time, a new record is added to three tables: user table 371, family (group) table 375, and family label table 377. A user table 371 is created for each user, and example user data is shown in FIG. 2. The user tables keep record of the user data. Examples of profile data include name, email, password, birthdate, birth location, occupation, etc. The user can select which data remains private at all times, such as set X, and which sets are shared with which family walls. A first set of data can be shared with only one family wall, while a different data set is shared with a second family wall. This allows a user to select how discretely they share among family groups.

Because a personal wall is made for the user to centrally locate information, details on the personal wall parameters, newsfeed drafts and posts, family members, family codes, photos, videos, messages in draft and send, scheduled future messages, blocked members of the network, deceased members of the network, instances of site abuse, etc. are listed in the user table 371. A sample user display for a personal wall is shown in FIG. 3. Simplified, alternative user displays are also shown in FIG. 9 to contrast the content among various users. The user table, like the other tables, can be populated by sub-tables, with examples shown in FIGS. 2E & 2F.

The family table 375 keeps details for the family members that share the family code, like other affiliated family codes, the member lists for the group, the newsfeeds for the family code, shared photos and videos, etc. When a new user joins a family code, their selected set of information designated for sharing is added to their user profile in the family table 375.

The third table, the family label table 377 keeps record of the labels of particular family codes for different users. User one can be associated with aggregate number of other members and a plurality of family codes. For security, it is beneficial to conceal the family codes from onlookers. So, the label table 377 is a mechanism to facilitate security. A family code is affiliated with a user, and that user's choice name for the family code is stored. When the user views that family wall or interacts with the users affiliated with the family code, the user's chosen name will appear. A label field will populate and update across that user's view pages for consistency of view, but will not interfere with other user's views of their family label. Thus, every member of a family code can have a different family code label. The user can select to view the actual code for sharing purposes. But, concealing the family code also gives the user the option of describing the family in a way that prevents imposters from readily joining the family code. This is unlike prior art systems where labels are uniform across pages for all participants.

A family member table 379 tracks which family codes are associated with which network members. A user can be associated with many families, and families can have many members.

A relationship table 373 indicates relationships between user table information 371 and family table 375 information. This sub-table tracks what information should be shared with which family codes.

Other examples of data tracking tables are shown in FIGS. 2C-2G. FIG. 2C shows an alternative example of a family code member table 3790. A network family member identification can be correlated to a user (member) identification, a family (group) identification, such as the family (group) code, initial family data, and a creation date for the family code. The database includes options to change or drop data, mark data as a primary source, mark and track unique data, track index of the data, and track the spatial data for storage and cross-referencing of data.

FIG. 2D shows an alternative example of a label table 3770 to correlate a family (group) identification, such as the family (group) code, to a network (FPW) code. The creation date of the group code is kept. Family label information is also stored to assist with concealment of the family code during display processes. The label information can link this table to other tables and sub-tables.

Figure 2E:
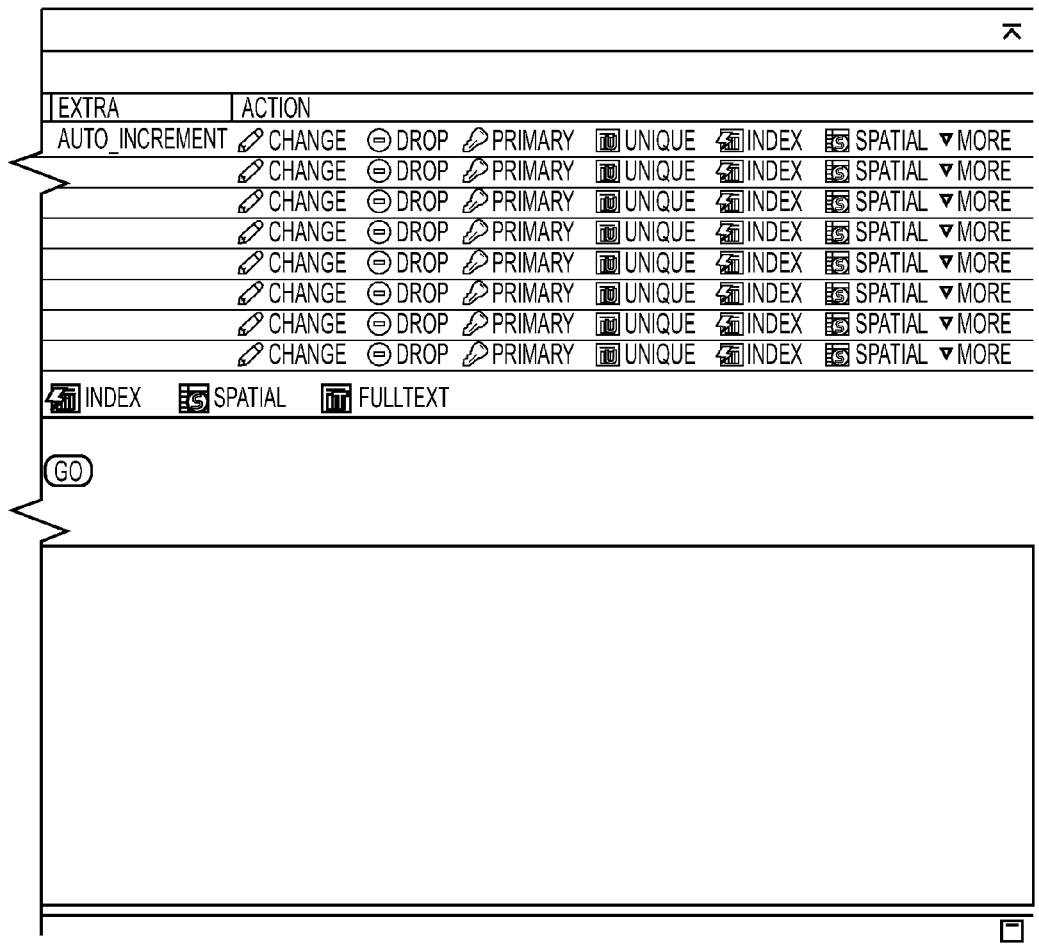
Figure 2F:
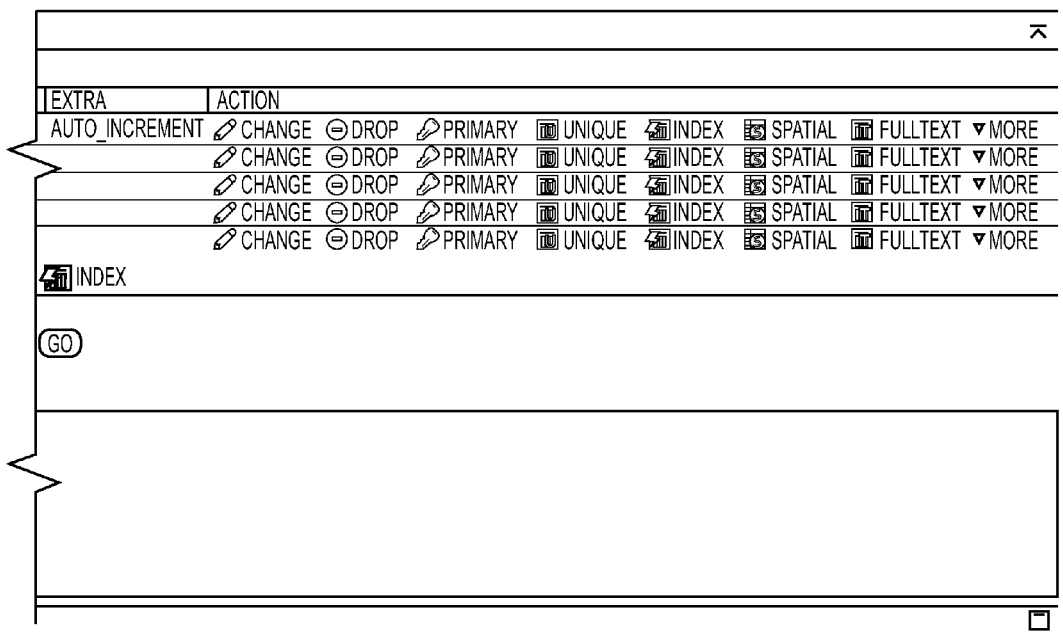
Figure 3:
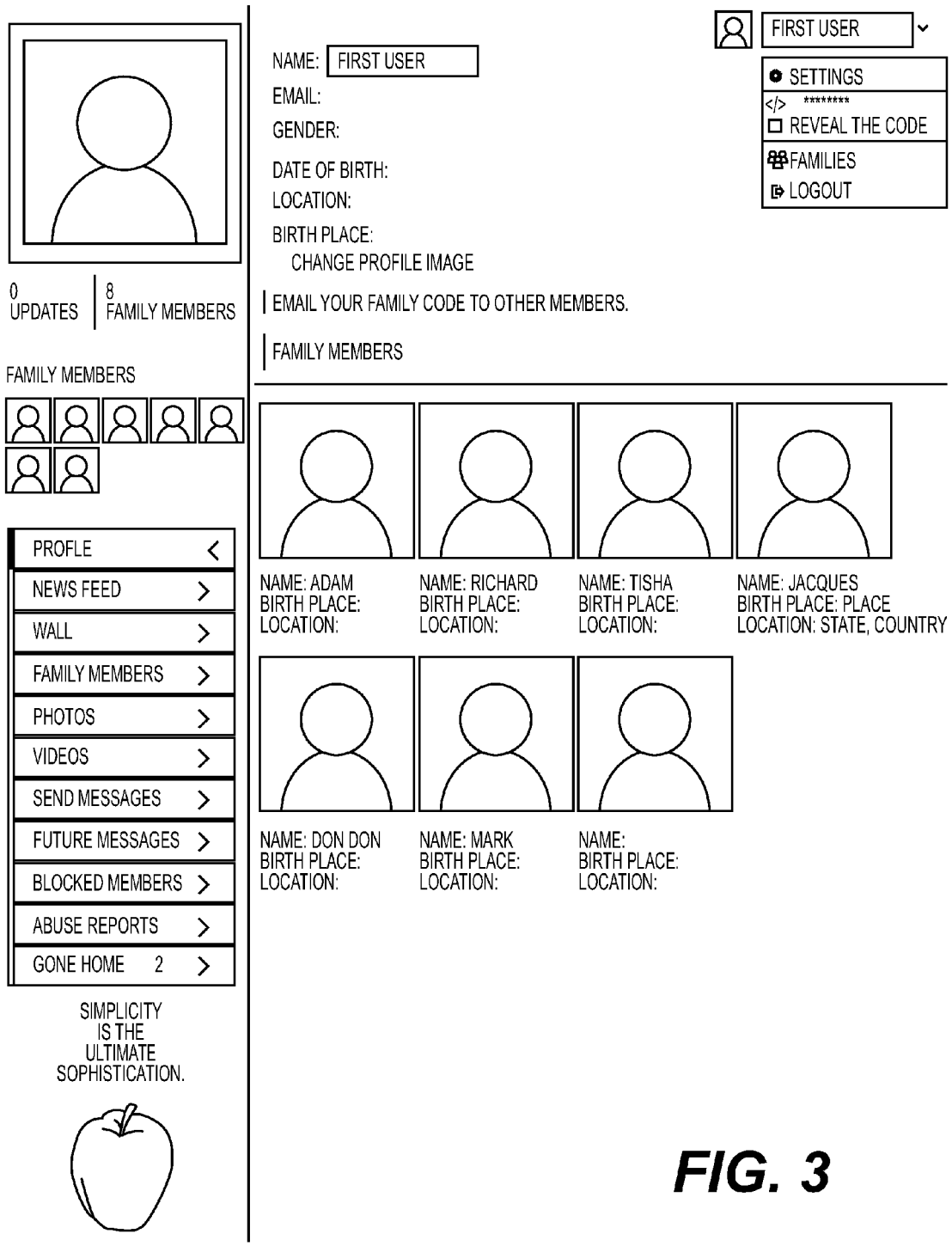
FIG. 3 is an example of a personal wall.

FIGS. 2E & 2F help illustrate sub-table interactions and the privacy functionality. Member information in the user table 371 includes allocation for photo information. A first photo sub-table 3711 in FIG. 2E shows that a user having an identification (ID) has an image path for linking to their photo. The photo has an image label. The image privacy setting is also listed, so the user indications are tracked for which family to share with, or whether the photo is private on the personal wall. The user can form albums of photos to organize the photos, and so an album identification is associated with the photo. Another network identification, such as uid_fk is also listed. When actively shared with family walls, the affiliated family codes are tracked in a family identification section. The network can also track the creation date of the photo.

FIG. 2F is an example of a comment sub-table 3713. In this example, comments on a user's shared photo are tracked. A comment identification is associated with the photo, the photo identification information is linked from photo sub-table 3711, along with the user identification. Comment messages are tracked, and the creation date for the comments are tracked. The example of FIGS. 2E & 2F can be applied in general to other aspects of member information, such as videos, newsfeed, messaging, etc.

FIG. 2G provides an alternative user table 3710. The alternative user table keeps record of the user data, and in this example, provides alternative profile data, including network identifiers, status, tokens, and personal data. Additional details track network information such as applied data compression, modifications made by other users, such as when the user has passed on, flags for participating in metrics, etc.

A personal wall is only created once for each user. The user aggregates data and family codes centrally. New family walls are created for newly generated family codes. The user can granularly sort relationships among the family codes. Instead of sharing everything with everyone, the user can select which family to share a particular level of data with. Family groups can centrally communicate with one another, but need not share specific details with extended family or ex-family members when those categories of family are not part of their family code, or when those categories of members are in distinct family codes that permit selective sharing. As above, aspects of personal wall data, such as legacy-specific or genealogical information, is shared when a user is deceased, but the family code affiliations can remain restricted from view to maintain the privacy and granularity that the user had while alive.

When a new user signs up with a family code upon login, the user has received the family code via private email or other communication. The new user is added to their own user table, a personal wall is created for the user, the personal wall affiliates with the family code, the user is added to the family table 375 and to the family member table 379, and the system prompts the user to label the family code to add the custom label to the label table 377. As the user builds their profile, adds to their personal wall, and shares with the family wall, the relationship sub-table is updated 373.

When a user logs in, the system can track their previous location or family code and present the user with the page affiliated with that last instance. Or, the user can be directed to a central aggregation of family code labels to choose which family wall to visit. Additional navigation is provided as shown in the example of FIG. 3. A user can adjust settings, check family codes, obtain the unique family code for sharing, navigate among families, or logout. Profile information is centrally displayed, along with various family members. Should a user wish to invite more members, the family code is easily shared with other members or email account holders. The user can readily see whether any family wall updates have been made along with number of family members. Further navigation examples include profile, newsfeed, personal wall, individual family information, photo and video centralization for users and family groups, message sending and scheduling, blocked member information, abuse reports against the user, and decedent (gone home) information. Advertising space can be reserved on a user's personal wall or on the family wall. Messages of encouragement can be shared in the advertising space.

To secure the information exchange between server and user, various security protocols are possible, such as API. To speed transmission and reduce file sizes, file conversion such as ImageByte can be used.

Figure 4:
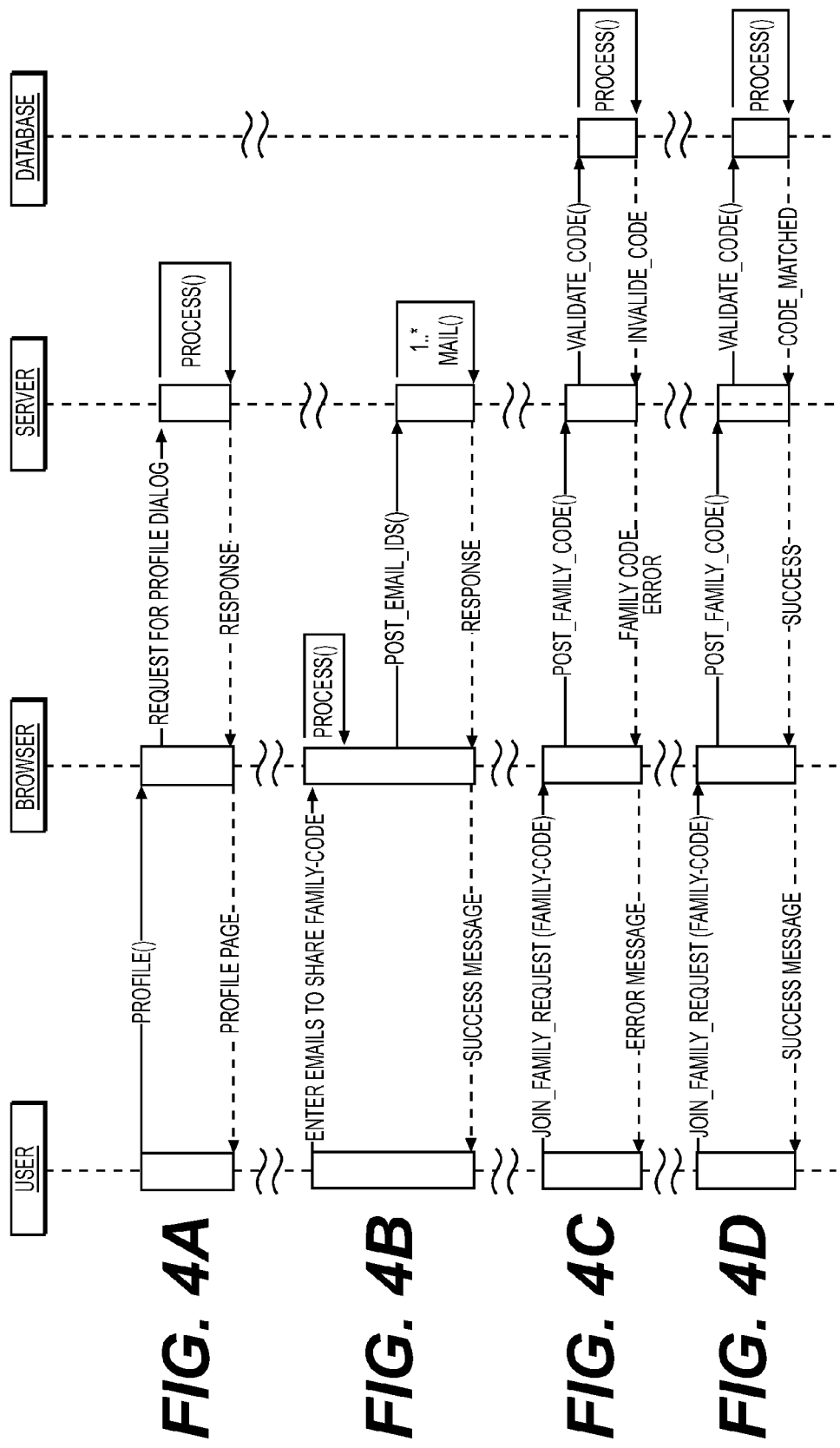
FIGS. 4A-4D are examples of process flows.

FIGS. 4A-4D illustrate examples of flow process between a user, browser, server, and database. FIG. 4A indicates a successful user profile set-up. A user sets up a login, which can be done with limited profile information. The profile is sent to the browser. The browser sends a request for a profile to the server, which processes the request. The response from the server is pushed to the user in the form of a profile page. As above, the set-up process includes forming entries in database tables, but in FIG. 4A, the server follows stored instructions to supply a profile page to populate a personal wall for the user.

In FIG. 4B, the process for adding members to a family code is outlined. A user enters emails on their personal wall to share their family codes to build their groups. This is done on the personal wall so that privacy is maintained. It is not done on the group or family walls, where other family members can see the action This provides separation of information between family groups. Members of family groups do not see each other, or invitations by one user to the other family groups, and so do not have hurt feelings because a family member continues to have a relationship with another member, nor do other members see that an invitation was turned down. The relationships of one user are private to the personal wall of the user and to the invited member, and it is not share with the other members or family groups.

The browser processes the entered emails and user requests. The browser inputs can be forwarded to the server, and the programming can check membership status with the server. The server can also work with the database to pull information, such as a limited subset of user profile information to append to the user inquiry. A mail message is formed with embedded data for linking an acceptance command back to the invitation. While the family code can be displayed in the message, it can also be concealed, with the database storing a correlation between the group code and the invitation. Acceptance unlocks the group wall with respect to the emailed user. A response and success message can be returned to the user to indicate the mail message.

FIGS. 4C and 4D compare a user request to join a particular family. This request can include the user provision of the family code, or the user use of a link to the family code. The browser receives the request to join a family and posts the family code to the server. The server validates the code against information in the database. After database processing, a return occurs. In FIG. 4C, the database processing discovers that the provided code is invalid, the server prepares a family code error message, and the error message is returned to the user by the browser. But in FIG. 4D, the family code is valid. Processing in the database returns a code match and the server processes a success sequence, including a push to the browser to provide a success message to the user. The user is added to the various tables, as above, so that the user is logged as a group member of a group code. Sharing and viewing features are enabled, and the group wall of the group code is converted from a locked state to an unlocked state with respect to the user.

Figure 5:
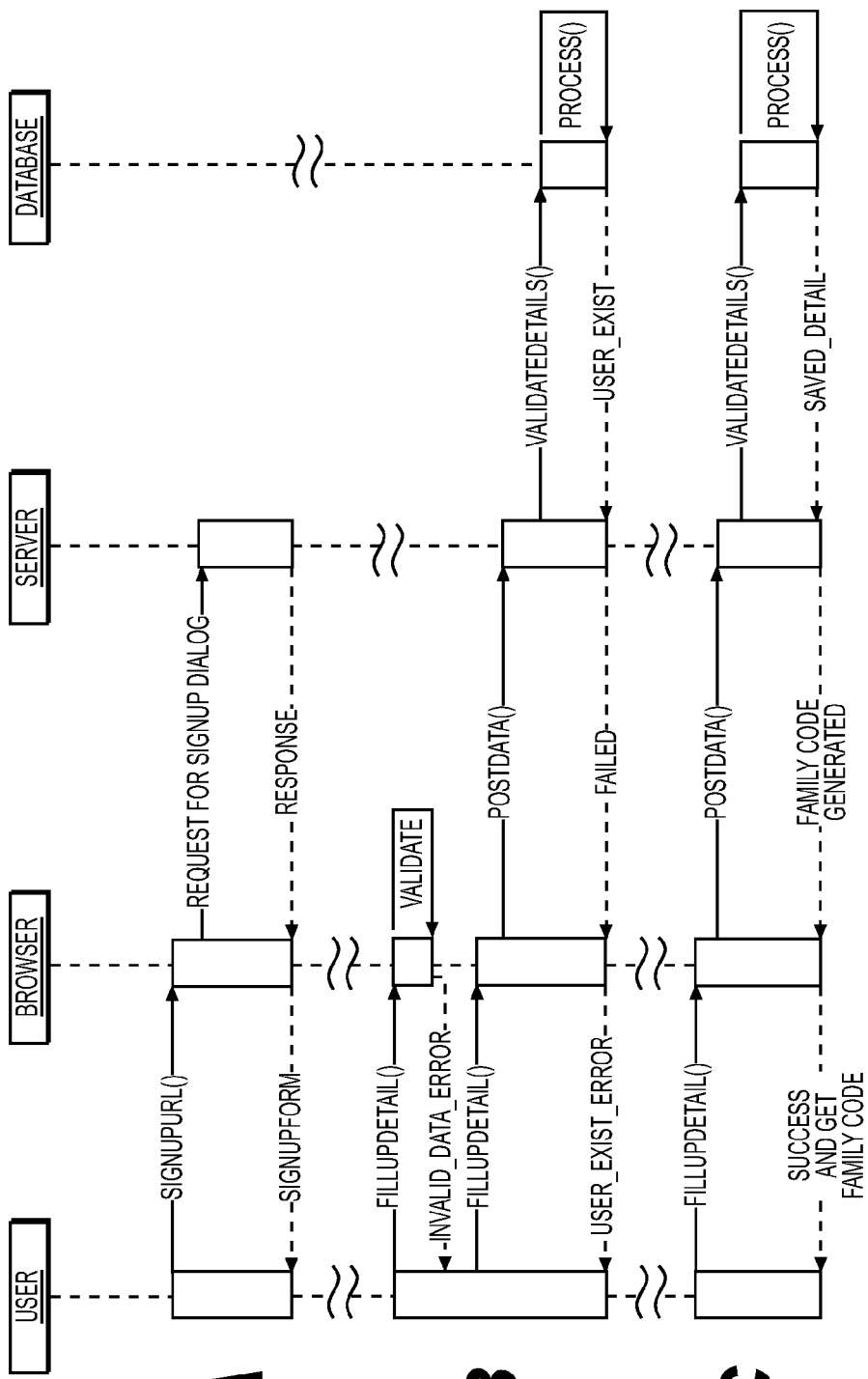
FIGS. 5A-5C are examples of process flows.

FIGS. 5A-5C show variations for user sign up. In FIG. 5A, a user has initiated sign-up independently by navigating to the signup page for the social network. The user activates the sign up URL at the browser. The browser forwards a request for sign up to the server. The dialog box is processed at the server and a response is returned to push a sign up form down to the user to gather initial profile information for the user, such as name, birthday, etc.

In FIG. 5B, the details filled in by the user in the sign up form are sent to the browser, where an initial validation is processed. At the browser level, inputs can be checked and invalidated to a certain extent. The user can re-fill portions of the sign up form with data, and the browser can post the data to the server. Processing validates details of the data in the database. In FIG. 5B, the user already exists in the database and has a personal wall. The existence of the user in the database results in a push of a failed set-up command and a message to the user that they exist. The message can be a user exists error message.

In FIG. 5C, the user successfully fills data in the sign up form and the validation and processing of the data details results in the saving of the user data in the database. The user is added to tables, as above. The server processing also results in the generation of a family code for the new user, and a success message is pushed to the user with a family code. The user is set up with a personal wall and a family wall.

Figure 6:
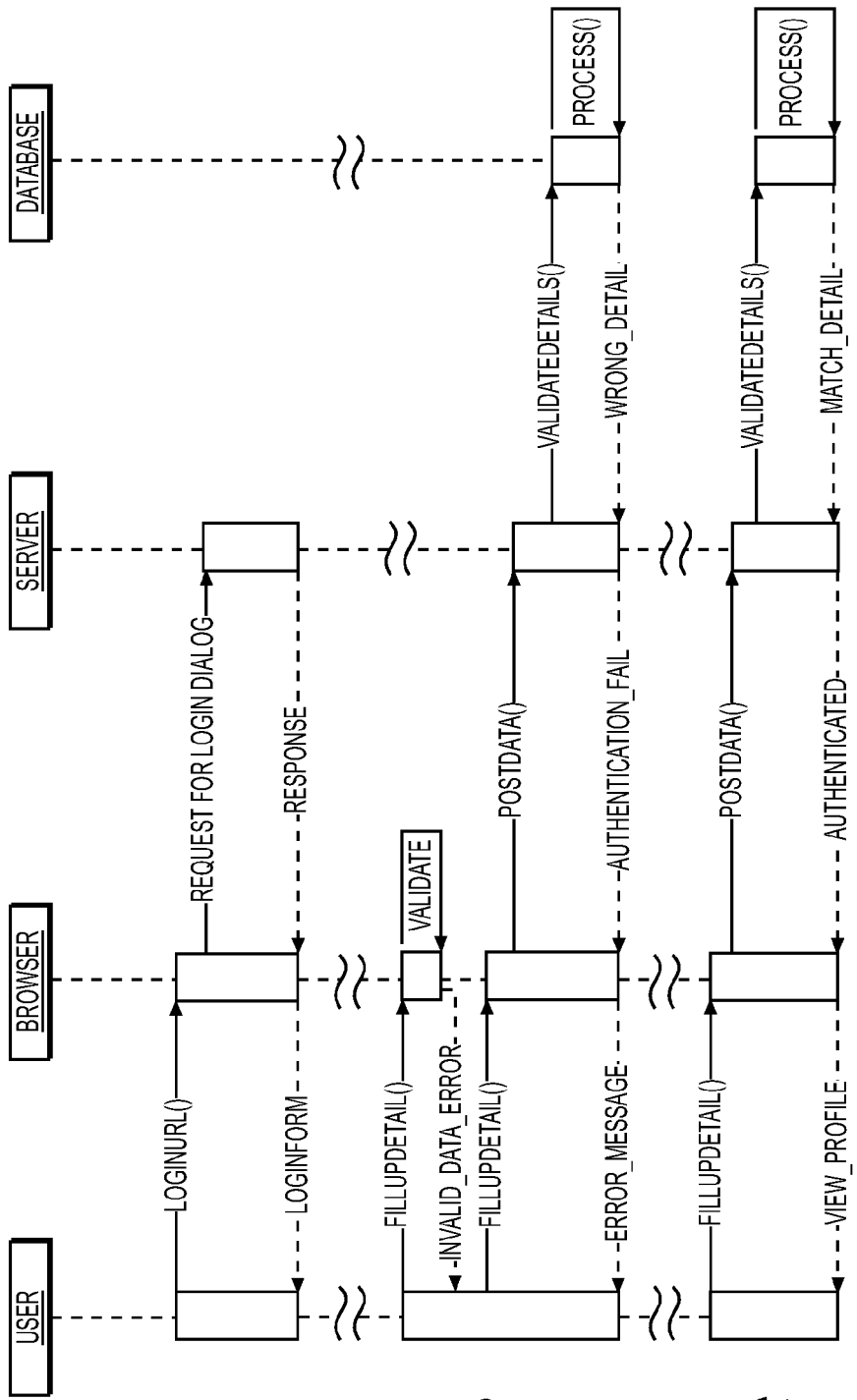
FIGS. 6A-6C are examples of process flows.

In FIGS. 6A-6C, a user attempts to login. In FIG. 6A, the user navigates to the social network and visits the login URL. The browser forwards a request for a login dialog box to the server, which processes a response to push a login form to the user. In FIG. 6B, the user unsuccessfully fills details in the login form. The browser validation fails and an error message is returned to the user in the form of an invalid data error message. The user fills new data details in the login form, the browser posts the data to the server, and the sever works to validate the details of the input data in the database. Processing returns a wrong detail error, and server pushes an authentication fail command back to the browser, which displays an error message to the user. In FIG. 6C, the user fills correct data in the login form. The server accesses the database and processing results in a match between the user input data and the database. The server returns an authenticated command and the browser configures for the user to view their profile, which can be their personal wall, or, as above, the last-viewed family wall or default family wall. Thus, the details pushed by the server to the user can include a bundle of user data from the database.

Unlike prior art, this social network seeks to provide limited genealogical reach. Instead of forcing connections between relatives, this system permits a user to respect the boundaries of social groups within families. Group-appropriate communications can be made without crossing group boundaries set by the user. At the same time, by setting boundaries within a user's social groups, the user can quickly and privately communicate with groups of members. Once grouped, the user can share with groups of members instead of one-by-one. This saves the user time. Instead of a single social page on a social network, a user is given at least two data-holding pages to work with in the form of a personal wall and a group wall. The two data-holing pages have different amounts and types of data linked to them, permitting the user a central updating area, and a drag-and-drop or other quick ability to update the other page. The user can amass a plurality of group walls and share from the personal wall. Each group wall functions as its own social network, with photos, newsfeeds, and other posts unique to that group, yet a user needs only one login to access their various group walls.

The format also overcomes limitations imposed on "active" versus "inactive" accounts. A user's personal wall has a set X of data that is deactivated upon their passing. This set X is private to the user, and is not shared with other members of the social network. Other data, such as a set 1 and set 2, are shared with the other members upon their passing. This permits a user to reserve data for legacy purposes. Instead of deactivating and deleting the user account, the reserved data is preserved on the group walls to fulfill genealogical purposes or other legacy purposes. Because a portion of the user account remains active, and because the group wall remains active, the user can schedule future communications with other members. Holiday greetings, special wishes for a milestone achieved, and other messages have linked places within the database 37.

In the above disclosure, "family code" and "group code" are used interchangeably. "Family wall" and "group wall" are also used interchangeably. The disclosure is not limited to only family groups, though that is the preferred use. Other groups of members can be formed, such as friends, colleagues, teammates, etc.

Other implementations will be apparent to those skilled in the art from consideration of the specification and practice of the examples disclosed herein. It is intended that the specification and examples be considered as exemplary only, with the true scope of the invention being indicated by the following claims.

What is claimed is:

1. A computer-implemented method of managing a social network comprising:
   receiving, at a server, a first user login at a browser accessible tool;
   transmitting the first user login from the from the browser accessible tool to a server over an internet;
   creating a unique first group code for the first user at the server;
   creating a first personal wall for the first user at the server, the first personal wall including a first link to the first group code, wherein the first link to the first group code is in the form of a first customizable label for concealing the first group code;
   creating a first group wall for the first group code at the server;
   receiving, at the server, an inquiry to join the first group code from a second user;
   converting, at the server, the first group wall from a locked state to an unlocked state with respect to the second user, wherein the locked state restricts the second user from accessing the first group wall, and wherein the unlocked state shares the first group wall with the second user; and
   creating, at the server, a second personal wall for the second user, the second personal wall including a second link to the first group code, wherein the second link to the first group code is in the form of a second customizable label for concealing the first group code,
   wherein the first user is restricted by the server from viewing the second personal wall and the second customizable label,
   wherein the second user is restricted by the server from viewing the first personal wall and the first customizable label,
   wherein the first personal wall is configured to share data from the first personal wall with the first group wall, and
   wherein the second personal wall is configured to share data from the second user personal wall with the first group wall.

2. The method of claim 1, further comprising receiving, at the server, the first group code from the second user during a second login.

3. The method of claim 1, further comprising the server:
   posting the inquiry received from the second user to the first group wall;
   receiving an accept command from the first user via the first group wall; and
   transmitting the first group code to the second user in response to the accept command.

4. The method of claim 1, further comprising transmitting by the server the first group code from the first personal wall to the second personal wall; and
   exchanging by the server an acceptance command between the second personal wall and the first personal wall.

5. The method of claim 1, further comprising the server:
   creating a second group wall and a second group code for the second user;
   receiving a third user login;
   creating a third personal wall for the third user, the third personal wall including a third link to the second group code in the form of a third customizable label for concealing the second group code;
   wherein the first user and the second user are restricted by the server from viewing the third personal wall and the third customizable label,
   wherein the third user is restricted by the server from viewing the first personal wall, the first customizable label, the second customizable label, and the second personal wall,
   wherein the third personal wall is configured to share data from the third personal wall with the second group wall,
   wherein the third user is restricted by the server from sharing data from the third personal wall with the first group wall,
   wherein the first user is restricted by the server from viewing shared data from the second user and from the third user on the second group wall, and
   wherein the second group wall is configured to share with the second user data from the third user on the second group wall.

6. The method of claim 1 further comprising the server:
   aggregating a plurality of unique group codes on the first personal wall, each of the plurality of unique group codes having a respective one of a plurality of group walls, each of the respective one of the plurality of group walls viewable and editable by the first user; and
   restricting the second user from viewing the plurality of unique group codes and restricting the second user from viewing or editing the respective plurality of group walls until the second user receives a respective set of links to the plurality of unique group codes.

7. The method of claim 6, further comprising the server:
   sharing a subset of data from the first personal wall with each respective one of the plurality of group walls while restricting a second subset of data from the first personal wall from each respective one of the plurality of group walls; and
   restricting a third subset of data from the first personal wall from view by any user but the first user.

8. The method of claim 7, further comprising the server converting the second subset of data to a viewable status when the first user account converts to a decedent status.

9. The method of claim 1, further comprising the server:
aggregating a plurality of user affiliations with the first group code, each of the plurality of users affiliated with the first group code having access rights to the first group wall; and
enforcing an acceptance metric for new users to limit access rights to the first group wall, wherein the acceptance metric is conditional on the number of the plurality of users affiliated with the first group code, and wherein a minimum number of accept commands must be received from the plurality of users affiliated with the first group code to convert the first group wall from a locked to an unlocked state with respect to the new user.

10. The method of claim 1, further comprising the server:
aggregating a plurality of user affiliations with the first group code, each of the plurality of users affiliated with the first group code having access rights to the first group wall; and
enforcing a rejection metric for new users to limit access rights to the first group wall, wherein the rejection metric is conditional on the number of the plurality of users affiliated with the first group code, and wherein a minimum number of rejection commands must be received from the plurality of users affiliated with the first group code to convert the first group wall from an unlocked to a locked state with respect to the new user.

11. The method of claim 1, further comprising the server:
creating a unique second group code for the first user;
linking the second group code to the first personal wall via a fourth link, the fourth link comprising another customizable label for concealing the second group code;
creating a second group wall for the second group code;
aggregating a first set of user affiliations with the first group code, and
aggregating a second set of user affiliations with the second group code.

12. The method of claim 11, wherein a subset of users in the first set of user affiliations overlap with a subset of users in the second set of user affiliations.

13. The method of claim 11, wherein users in the first set of user affiliations are different from the users in the second set of user affiliations.

14. The method of claim 11, wherein shared data from each user in the first set of user affiliations is configured by the server for viewing by the first user, wherein shared data from each user in the second set of user affiliations is configured by the server for viewing by the first user, and wherein each user in the first set of user affiliations must get respective affiliation with each user in the second set of user affiliations to view shared data of each user in the second set of user affiliations.

15. The method of claim 11, wherein shared data from each user in the first set of user affiliations is configured by the server for viewing by the first user, wherein shared data from each user in the second set of user affiliations is configured by the server for viewing by the first user, and wherein each user in the first set of user affiliations must get respective affiliation with the second group code to view shared data of each user in the second set of user affiliations.

16. The method of claim 11, wherein the first personal wall comprises aggregated data sets and functions as a central data repository, wherein the method comprises the server:
sharing a first subset of data from the aggregated data sets with both the first group wall and with the second group wall;
sharing a second subset of data from the aggregated data sets with only the first group wall; and
sharing a third subset of data from the aggregated data sets with only the second group wall.

17. The method of claim 1, further comprising the server:
enabling a messaging function on the first personal wall;
enabling a messaging function on the second personal wall; and
enabling the first user to schedule a message to transmit from the first personal wall to the second personal wall at a preselected future time.

18. The method of claim 1, further comprising the server:
enabling a newsfeed compose function on the first personal wall;
enabling a newsfeed posting function on the first group wall; and
enabling the first user to schedule a newsfeed to transmit from the first personal wall to the first group wall at a preselected future time.

19. The method of claim 1, further comprising the server:
aggregating a plurality of user affiliations with the first group code, each of the plurality of users affiliated with the first group code having access rights to the first group wall;
enforcing a conversion metric to convert one of the users of the plurality of user affiliations from an active status to a deceased status, wherein the conversion metric is conditional on the number of the plurality of users affiliated with the first group code, and wherein a minimum number of conversion commands must be received from the plurality of users affiliated with the first group code to convert one of the users of the plurality of user affiliations from an active status to a deceased status; and
upon conversion to a deceased status, a subset of data from the personal wall of the one of the users of the plurality of user affiliations converted to deceased status is viewable by the remaining users of the plurality of user affiliations while the remainder of the data from the personal wall of the one of the users of the plurality of user affiliations converted to deceased status is deactivated.

20. The method of claim 1, further comprising the server:
receiving a first customized label for the first group code from the first user;
commanding the browser accessible tool of the first user to display the first customized label for the first group code on the first personal wall and on the first group wall;
receiving a second customized label for the first group code from the second user;
commanding a second browser accessible tool of the second user to display the second customized label for the first group code on the second personal wall and on the first group wall; and
restricting display of the first customized label so that is does not appear to the second user.

* * * * *